United States Patent [19]

Watson

[11] Patent Number: 4,491,739
[45] Date of Patent: Jan. 1, 1985

[54] AIRSHIP-FLOATED WIND TURBINE

[76] Inventor: William K. Watson, 5409 Denver Ave. South, Seattle, Wash. 98107

[21] Appl. No.: 424,583

[22] Filed: Sep. 27, 1982

[51] Int. Cl.$^3$ .............................................. F03D 9/00
[52] U.S. Cl. ....................................... 290/44; 290/55
[58] Field of Search ...................... 290/44, 55; 416/85, 416/193 R, 194, DIG. 4, DIG. 6

[56] References Cited

U.S. PATENT DOCUMENTS

| | | | |
|---|---|---|---|
| 4,073,516 | 2/1978 | Kling | 290/55 |
| 4,166,596 | 9/1979 | Mouton, Jr. et al. | 290/55 X |
| 4,285,481 | 8/1981 | Biscomb | 290/55 X |
| 4,309,006 | 1/1982 | Biscomb | 290/55 X |
| 4,350,895 | 9/1982 | Cook | 290/55 |
| 4,350,896 | 9/1982 | Benoit | 290/55 |
| 4,350,897 | 9/1982 | Benoit | 290/55 |
| 4,350,898 | 9/1982 | Benoit | 290/55 |
| 4,350,899 | 9/1982 | Benoit | 290/55 |

Primary Examiner—Stanley J. Witkowski
Assistant Examiner—W. E. Duncanson, Jr.
Attorney, Agent, or Firm—Seed and Berry

[57] ABSTRACT

A wind turbine, by use of a tethered airship for support, may be designed for the economical recovery of power at heights of 2,000 feet or more above ground, at which height power density in the wind is typically three times the power density available to a conventionally supported wind turbine. Means can be added to such an airship-floated wind turbine which will permit its generators to be used to meet load demand even during periods of little or no wind.

Described to this end is a wind turbine system which combines, among other novel features: (a) a novel tether line system which provides access for men and materials to the supporting airship while in active service, (b) a novel system for providing additional buoyant lift at the nose of the turbine-supporting airship to offset the vertical component of tension induced in the tether line by the downwind force exerted by the turbine blades, (c) a novel bearing assembly at the nose of the supporting airship which permits the airship to rotate as a unit with the turbine it supports without causing a similar rotation of the tether line, (d) a novel turbine airship structure which handles concentrated loads from the turbine efficiently and also permits the safe use of hydrogen for buoyancy, (e) a novel "space frame" structure which supports the turbine blades and greatly reduces blade weight, (f) a novel system for controlling turbine blade angle of incidence and for varying blade incidene in synchrony with blade angular position abut the turbine axis to provide greater control over airship movement, (g) a novel system for locating propellor-driven generators out at the wind turbine perimeter and for using lightweight, high-RPM generators to produce electrical energy at a power line frequency, which greatly reduces the weight required to convert turbine blade torque into useful power, and (h) a novel system for incorporating compressed air storage and combustion turbine components into the wind turbine's generator drive systems to provide a supplementary source of power for driving the wind turbine's generators.

22 Claims, 24 Drawing Figures

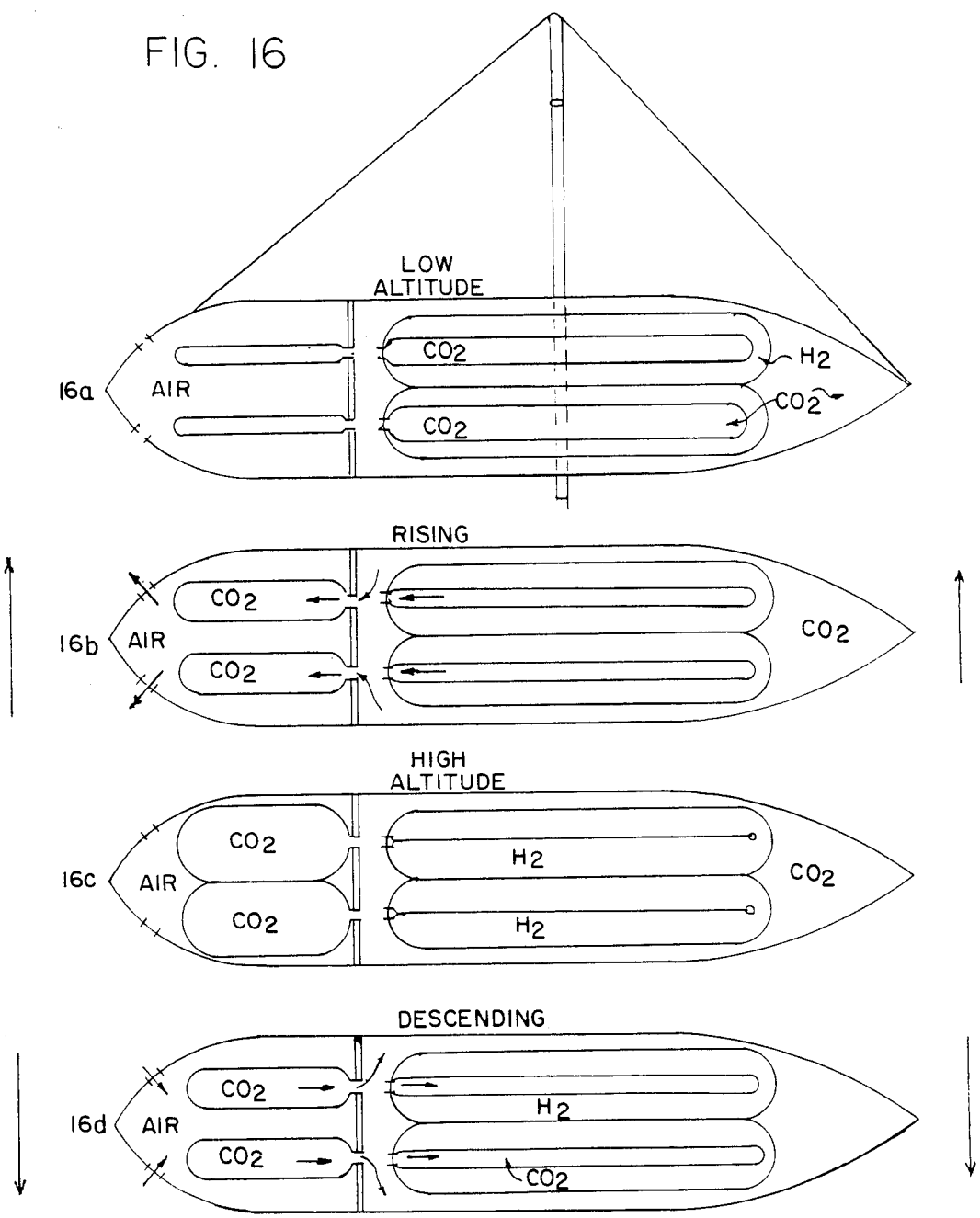

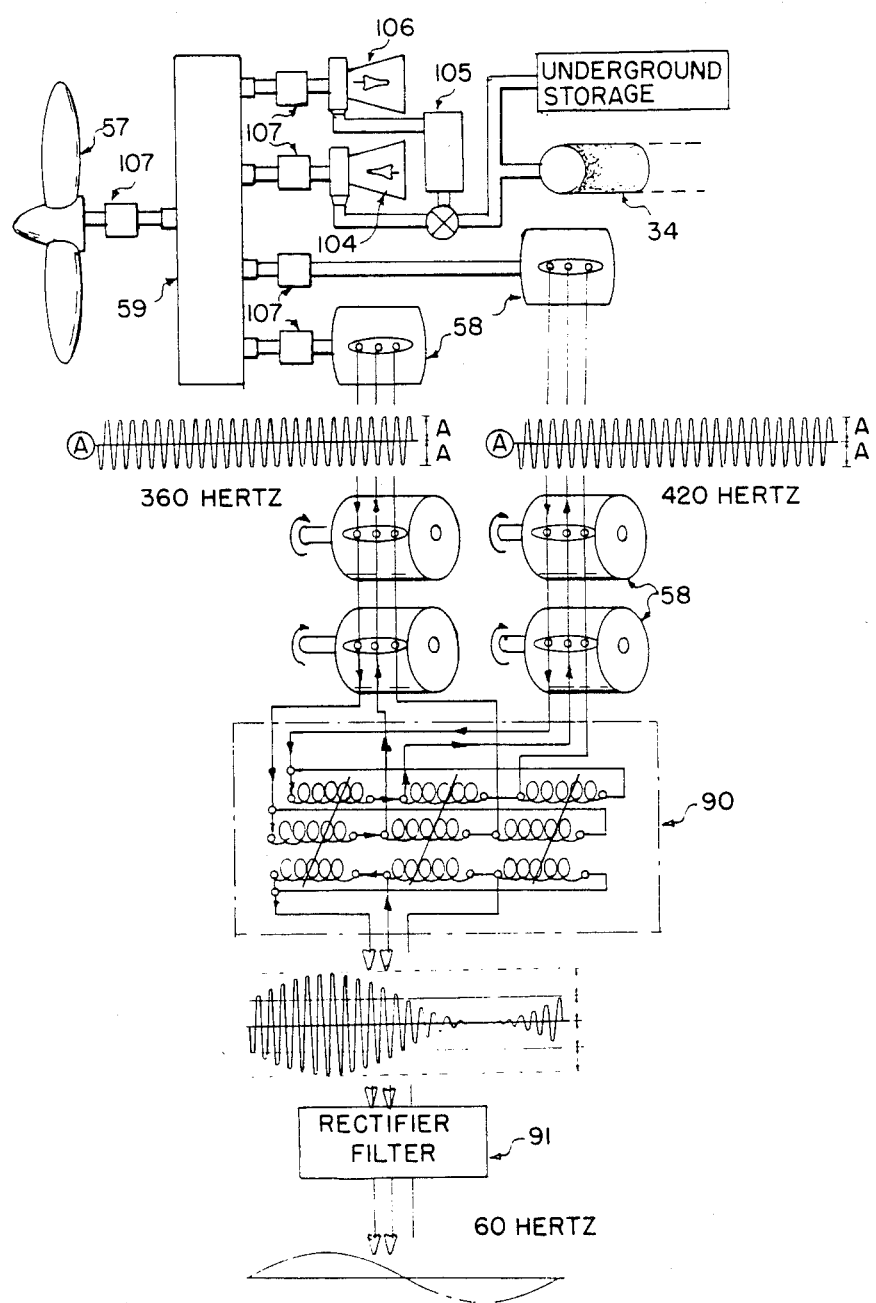

AIRSHIP-FLOATED WIND TURBINE

DESCRIPTION

TECHNICAL FIELD

This invention relates to wind turbines, and specifically to a way of constructing commercially useful wind turbines with diameters exceeding 1000 feet which can be operated at heights of several thousand feet above ground.

BACKGROUND ART

The conventional wind turbine for producing power is tower mounted and employs two or three blades cantilevered out from a central axle which in turn drives a generator by means of a step-up gearbox. It is thought that 300 feet is about the maximum feasible diameter and hub height for a wind turbine of this design; that a greater diameter and hub height would involve disproportionately increased costs for such turbine components as the tower, the blades, and the step-up gearbox. The present invention instructs how a wind turbine may be designed so that turbine diameter and operational height may be increased to many times this 300 foot limit and at the same time become an economical means of converting the wind's power into useful energy.

DISCLOSURE OF INVENTION

In general terms, a tether line extends from a ground anchor to a bearing assembly located at the nose of a buoyant gas airship. From several points along a compression spine at the axis of this airship, tensional members extend out to support a ring which encircles the airship. The ring in turn supports the outer ends of turbine blades which extend radially inward from the ring to the airship. The bearing assembly at the nose of the airship permits the airship to turn as a unit with the turbine blades and ring without producing a similar rotation of the tether line. The turbine blades are used to force the rotation of the ring. As the ring rotates, propellors mounted on pylons extending out from the ring are forced to turn. The rotation of the propellers generates useful power, which is transmitted via the tether line to ground level.

Of the many novel features which contribute to the invention, the most important are:

1. Multiple propeller-driven power trains placed at the ring perimeter, where the high vector sum air velocity enables the propellors to be driven at a high RPM, which minimizes the weight of the power train required to transform the rotation of each propellor to useful power.

2. A novel electrical generating system in which each propellor at the ring perimeter drives two lightweight, high-frequency generators at angular velocities which cause their output frequencies to differ by the local power line frequency. The two frequencies are then added together and the resulting wave form rectified and filtered to produce useful power at the local power line frequency.

3. A novel system for supporting the turbine blades in which sections of each lightweight turbine blade are suspended, like beads on a string, within a complex "space frame" whose major features are a compression ring held in position encircling a compression spine by means of tensional members extending between the ring and spine. The aforesaid spine is located along the axis of the turbine-supporting airship.

4. A novel internal airship structure in which the compression spine is used with rib rings, rib spokes, and a network of cables to produce a set of internal trusses centered on this spine, which permits the distributed lift exerted by the buoyant gas used in the airship to be efficiently conveyed to a few load points along this spine where the weight of the surrounding turbine must be picked up.

5. A novel system for controlling turbine blade angle of incidence in which adjustable fins for control of blade angle of incidence are mounted on pods distributed at intervals along each blade and appropriate movement of each fin is brought about by an adaptation of a standard aircraft flight control system in which (a) a source of a command signal specifies the desired blade angle of incidence, (b) a local angle of attack sensor reports the existing local blade angle of incidence, (c) an amplifier compares the command and sensor signals, and, on this basis, actuates a motor, and (d) the motor in turn moves the fin as required to change the existing local blade angle of incidence to that mandated by the command signal.

6. A novel system for exercising increased control over airship movement of varying turbine blade angle of incidence in step with blade angular position around the turbine disk area. In one embodiment, the required processing of the command signal sent to each blade is done with linear potentiometers actuated by a swash plate.

7. A novel bearing assembly at the nose of the turbine-supporting airship in which the airship tether line connects to the front end of a horizontal axis hinge bearing whose aft end connects to the front end of a vertical axis hinge bearing whose aft end connects to the inner member of a concentric thrust bearing to whose outer member the airship is connected. This particular sequence of bearings allows the turbine-supporting airship to rotate without producing a similar rotation of the tether line, and, at the same time, allows the airship freedom of angular motion with respect to the tether line.

8. A novel system for providing the additional buoyant lift needed to offset the vertical component of tether line tension which will result from the maximum downwind force expected to be exerted by the turbine. The system may include a second airship tied by tether lines to the bearing assembly at the nose of the turbine-supporting airship, or extra buoyant lift in the turbine airship itself, placed as closely as possible to the nose of the airship, with ballast added at the rear of the airship to balance out the moment of force exerted by the added lift about the bearing assembly at the nose of the airship.

9. A compressed air handling and storage system in the airship-floated wind turbine system, and a combustion turbine in each propellor-driven power train used to drive the turbine generators out at the ring perimeter. The compressor sections can be used separately to compress air for storage whenever the power available in the wind via the propellors exceeds current load demand. The compressed air thus stored can be used later in the combustion turbine section of the power train, with or without the addition of fuel for combustion, whenever power currently available from the wind falls below load demand. Finally, if wind is inadequate and stored supplies of compressed air have been depleted, the compressor, combustor, and combustion turbine sections can be operated together as normal combustion turbines to drive the power pod generators and thus meet load demand.

10. A novel system for safely using hydrogen for airship buoyant lift by surrounding enclosures for hydrogen within the airship with a barrier layer of noncombustible gas, such as $CO_2$, and then providing a sufficient separate volume for air within the airship so that expansion of the hydrogen and noncombustible gas with changes in temperature and altitude can be compensated for by displacement of this air to the outside of the airship.

11. A novel system for providing access to the turbine airship while in active service which uses the tether line as part of an elevator system in which a cab for transportation of men and materials is supported on rails supported in turn from the tether line. The cab ties to a cable which extends over a motor-driven drum at the tether line upper end, and on the other side, extends down to a counterweight which moves oppositely to the cab.

BRIEF DESCRIPTION OF THE DRAWINGS

FIGS. 16 a, b, c, and d shows, in a sequence of four schematic drawings, how a barrier of noncombustible gas can be maintained in an airship between hydrogen and the nearest air with which it could form a combustible mixture, despite large changes in the volumes of the hydrogen and noncombustible gas with changes in temperature and airship altitude.

FIG. 21 is a schematic showing how a wind-driven propellor and gear system may be used with high-frequency generators to produce a power line frequency output, and how compressed air storage and combustion turbine components can be added to supplement the fluctuating amount of power available from the wind for driving these generators to meet a power system load.

BEST MODE FOR CARRYING OUT THE INVENTION

Figures 1, 2:
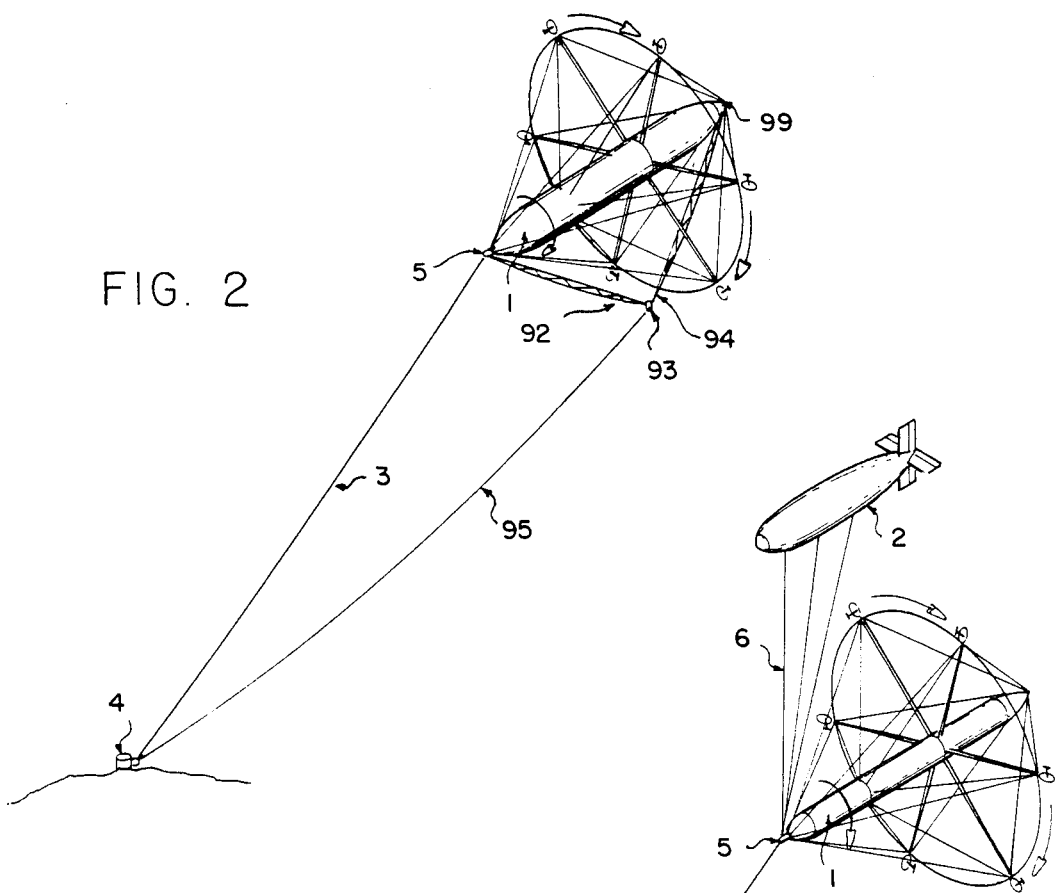
FIG. 1 is an isometric, overall view of a first embodiment of this invention, in which a second airship is used to supply the extra buoyant lift needed at the nose of the turbine airship.
FIG. 2 is an isometric, overall view of an alternative embodiment in which the extra buoyant lift needed is enclosed within the turbine airship itself.

For clarity of presentation, the major features of this invention will first be presented in outline form, along with the numbers of the drawings which most clearly illustrate each feature. A much more detailed description follows and deals in turn with each major feature as a separate part, and also with numerous subsidiary features, the more important of which are listed within parentheses in the following outline.

1. In each of the two preferred embodiments (FIGS. 1 and 2), a tether cable 3 extends from a ground anchor 4 to a bearing assembly 5 located at the front end of a turbine-supporting airship 1. (Subsidiary features: tether line elevator system, electrical transmission line).

2. Bearing assembly 5 (FIG. 4) permits turbine airship 1 to revolve as a unit with the turbine elements it supports, without producing a similar rotation in tether line 3, while allowing the turbine airship 1 freedom of angular movement with respect to the tether line 3. (Subsidiary feature: hydrostatic thrust bearing.)

3. A complex "space frame" surrounds the turbine airship 1 (FIG. 8) to support turbine blades 43. Its basic structure consists of a compression ring 34 held in position encircling airship 1 by tensional members 36 which extend inwardly to various load points 38a,b,c,d along compression spine 35 at the axis of airship 1. (Subsidiary feature: means for blade support at intermediate points.)

4. Within turbine airship 1 (FIG. 8), spine 35, rib rings 39, rib spokes 40, and a network of cables 41 and 42 combine to form an internal truss system centered on spine 35. This truss system efficiently conveys the distributed lift exerted by a buoyant gas within airship 1 to the airship spine load points 38a,b,c,d, where the weight of the surrounding turbine must be picked up. (Subsidiary feature: means for isolating hydrogen if used as the buoyant gas.)

5. The angle of incidence of turbine blades 43 (FIG. 9) is adjusted to force the rotation of compression ring 34 about the turbine axis by fins 49 appended to pods 48 distributed at intervals along each blade 43. (Subsidiary feature: blade incidence control means.)

6. Propellors 57 (FIG. 12) mounted on power pods 52 supported from compression ring 34 are forced into rotation by the vector sum of the wind's velocity and the circumferential velocity of compression ring 34, as forced by turbine blades 43.

7. The forced rotation of propellers 57 (FIG. 12) is in turn used to drive a lightweight electrical generating system. (Subsidiary feature: auxiliary power from compressed air storage, combustion turbine).

8. The power thus generated is sent down to ground level via tether line 3 (FIG. 1).

9. Miscellany: field construction of airship-floated wind turbine design of airship longitudinal weight trimming system.

Some of the dimensions, weights, stress loads, etc., determined in the course of an engineering study for a 1320-foot diameter wind turbine will be included in this detailed description as an aid to understanding how so large a wind turbine can be made light enough to float on an airship of practicable size. For ease of identification, all material abstracted from this engineering study will be enclosed in parentheses, preceded by the initials e.t., that is, "(e.t.: . . . )."

Part 1

In FIG. 1, additional tether lines 6 extended upward from bearing assembly 5 to counterpoise airship 2, which provides the extra buoyant lift needed to offset the vertical component of tension in tether line 3 that will result from the maximum downwind force that will be exerted by the turbine mounted on turbine airship 1.

(e.t.: The diameter of the turbine is 1320 ft. Angle of tether line 3, end to end, at maximum thrust: 16°. Maximum turbine thrust at a rated wind speed of 36 ft/sec: 1,665,400 lbs. Corresponding tension in tether line 3 is 1,756,400 lbs. Tether line 3 is of Kevlar 49 material, sized for a normal maximum stress load of 60,000 lbs/in$^2$ of material cross-section. The resulting tether line is 8710 feet long, 2×5.2" in diameter, 160,400 lbs in weight. Counterpoise buoyant lift needed at bearing asembly 5 is 558,100 lbs.

In FIG. 2, the extra buoyant lift needed to exert the required amount of upward force (e.t.: 558,100 lbs) on bearing assembly 5 is placed inside turbine airship 1 as closely as possible to the airship front end. Since the resultant force caused by the extra buoyant lift is now exerted at a point aft of bearing assembly 5, an upward moment of force must be countered by a downward moment of force exerted by ballast 99, which is preferably placed as close as possible to the rear of airship 1. Due to the difference in moment arm lengths, a relatively small amount of ballast 99 will as needed to balance out moments of force in this fashion while still leaving the requiring amount of upward force acting on bearing assembly 5.

Figure 3:
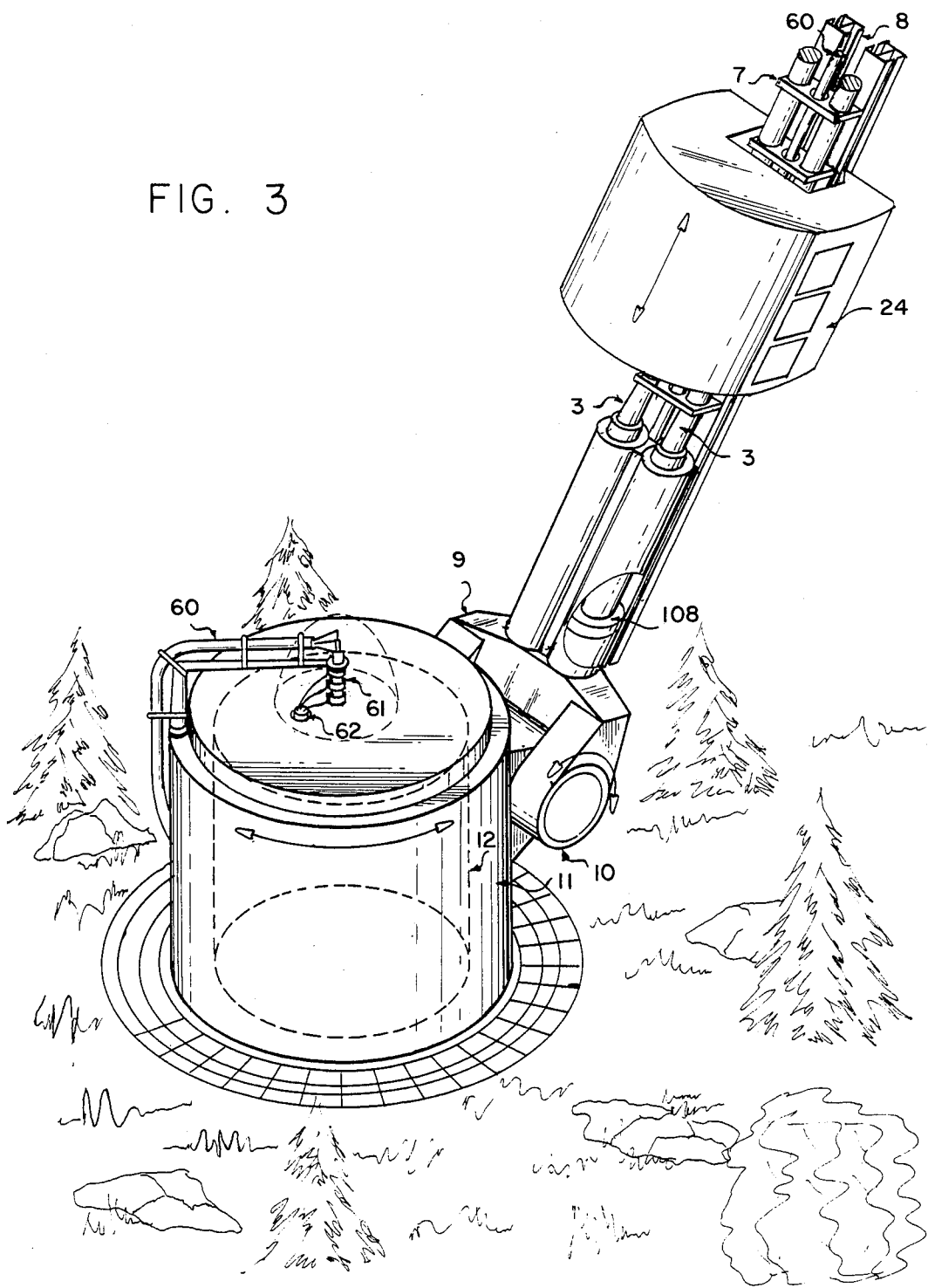
FIG. 3 is an enlarged isometric view of a ground anchor and of the lower ending of a tether line shown in FIGS. 1 and 2.
Figure 5:
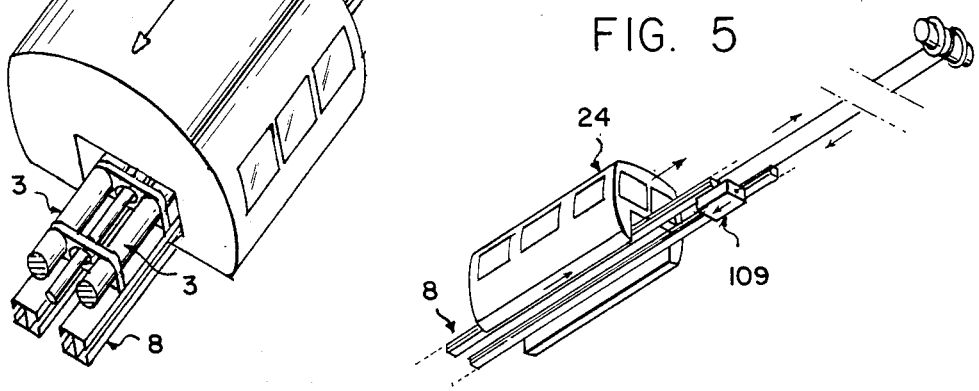
FIG. 5 is an isomeric view of how the tether line can be used as part of an elevator system for transporting men and materials to the turbine airship.

FIG. 3 shows in more detail ground anchor 4 and the lower end of tether line 3, which is divided into two parallel cables 3 (e.t.: 5.2" diameter each) held apart by spacers 7. The spacers in turn support rails 8, which run parallel to tether cables 3 from ground anchor 4 up to bearing assembly 5 at the airship nose. Cab 24, supported from rails 8, provides a means by which men and materials may be readily moved between ground anchor 4 and turbine airship 1. A suitable elevator system for moving cab 24 is shown in FIG. 5, in which a counterweight 109, supported from the inner channel of rails 8, moves oppositely to cab 24.

Figure 4:
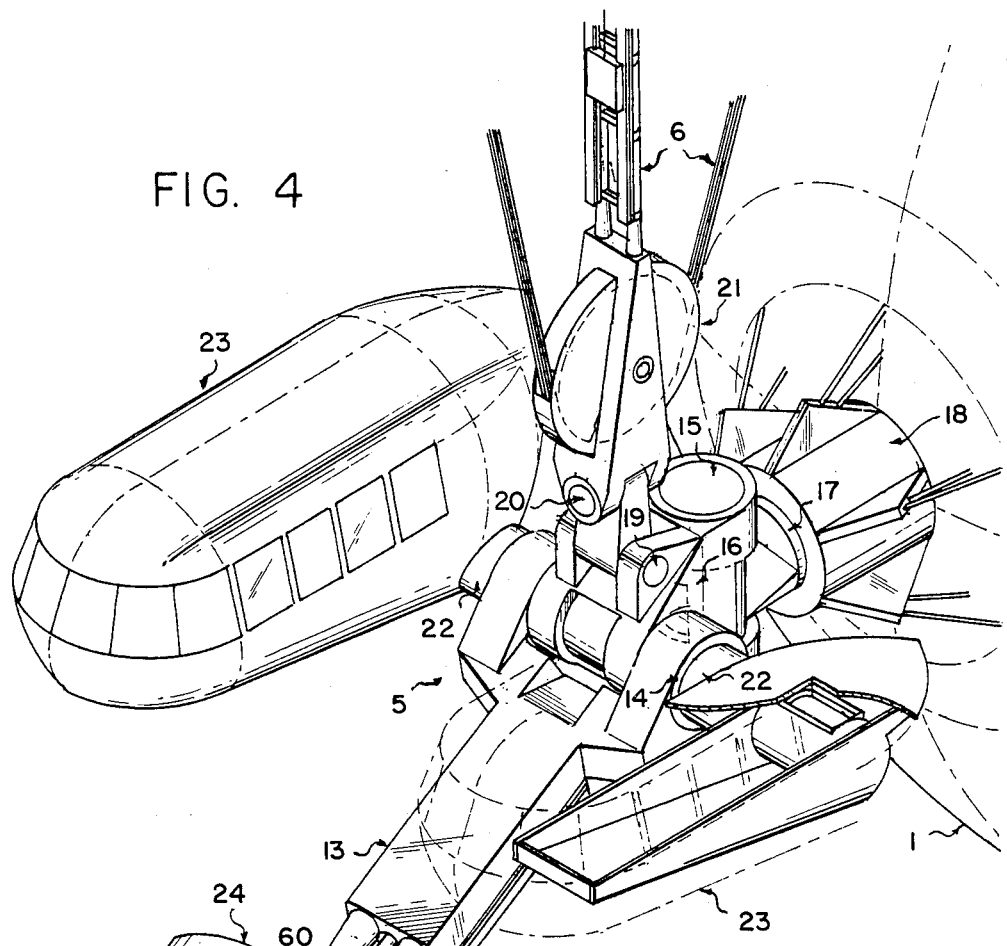
FIG. 4 is an isometric view of a bearing assembly which rotationally decouples the rotating turbine airship from its tether line while allowing the airship free angular movement with respect to the tether line.

In FIG. 4, the lower ends of tether cables 3 attach via lever arm 9 to one side of horizontal axis hinge bearing 10. Lever arm 9 incorporates a shock absorber 108 as insurance against snap loads occurring in the tethering system during severe storms. The other side of hinge bearing 10 attaches to the side of bearing sleeve 11, which in turn is free to rotate about vertical axle 12 fixed to the earth's surface. The electrical output of the wind turbine's generators can be brought by cable 60 to the rotational axis of sleeve 11 and there transferred via slip ring assembly 61 to cable 62 connected to the ground level system.

The extra buoyant lift provided at the nose of the turbine airship should obviously exceed the weight of the tether line and the transportation system it supports in order to keep tether line 3 taut even when it is extending straight up from ground anchor 3 to the nose of turbine airship 1. (e.t.: extra buoyant lift is 558,100 lbs. Weight of tether line 3 is 160,420 lbs. Lift margin to keep tether line 3 taut: circa 240,000 lbs.)

Part 2

FIG. 4 shows in more detail the components of bearing assembly 5 at the front end of rotating turbine airship 1. Here, the upper ends of twin tether cables 3 attach via lever arm 13 to horizontal axis hinge bearing 14, which in turn is cross-connected by common body 16 to the front side of vertical axis hinge bearing 15. Cylinder 17 extends from the aft side of hinge bearing 15 into the interior of thrust bearing 18, there serving as the innermost of two concentric cylinders between which the remaining components of thrust bearing 18 are sandwiched. Outward extensions 22 of horizontal axis hinge bearing 14 serve to support cabins 23 for use in the operation and maintenance of the above-ground system.

FIG. 4 also indicates how the components of bearing assembly 5 might be built to provide internal passageways for the protected movement of men and materials between tether line 3, cabins 23, and the interior of turbine airship 1.

If a second airship is used, cross-connected bearings 19 and 20 and pulley 21, as shown in FIG. 4, will serve to allow tether lines 6 to be attached to three points along the underside of counterpoise airship 2 in FIG. 1, thus distributing the stress load while allowing airship 2 freedom of longitudinal pitching motion.

In FIG. 1, the buoyant lift of counterpoise airship 2 is exerted directly at the point it is needed—at the upper end of tether line 3. In FIG. 2, the extra buoyant lift needed is placed within turbine airship 1 aft bearing assembly 5, which requires that thrust bearing 18 transmit not only a large thrust load (e.t.: 1,665,400 lbs) but also a substantial bending load (e.t.: 558,500 lbs). The advantage of the latter arrangement is that it eliminates the need for a second airship and thus any possibility in a severe storm of a destructive interaction between the two airships of FIG. 1.

Figure 6:
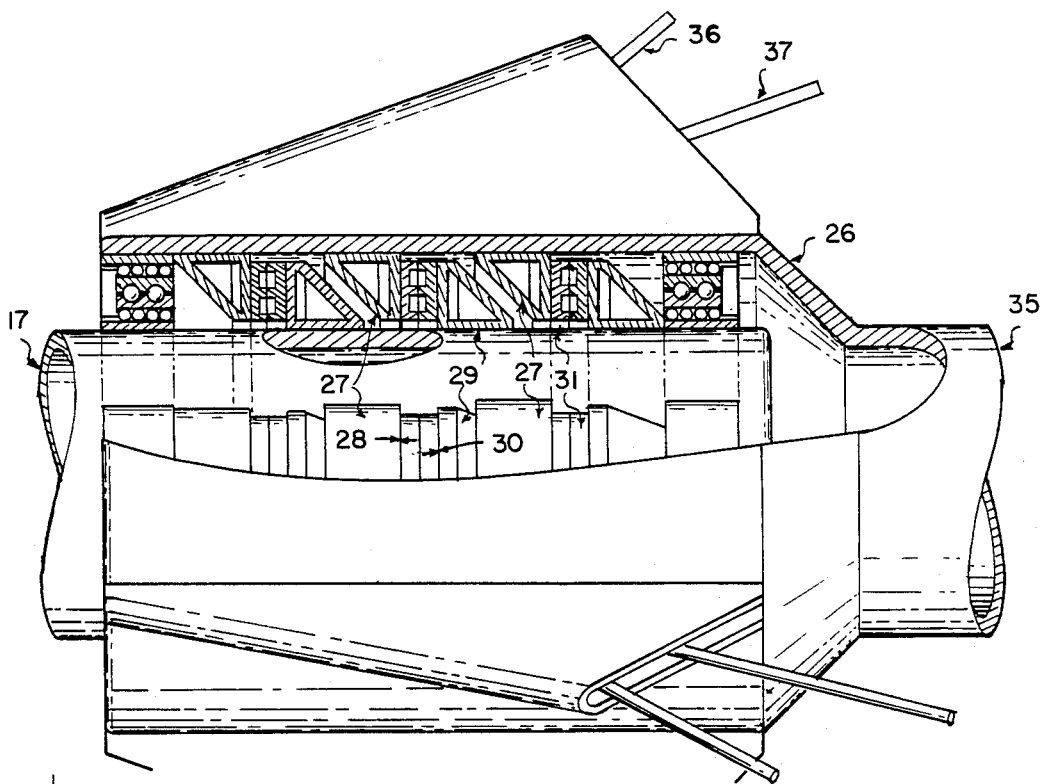
FIG. 6 is a partially sectioned view in elevation of a hydrostatic thrust bearing used as part of the bearing assembly at the nose of the turbine airship, whose function is to rotationally decouple the airship from the tether line.
Figure 7:
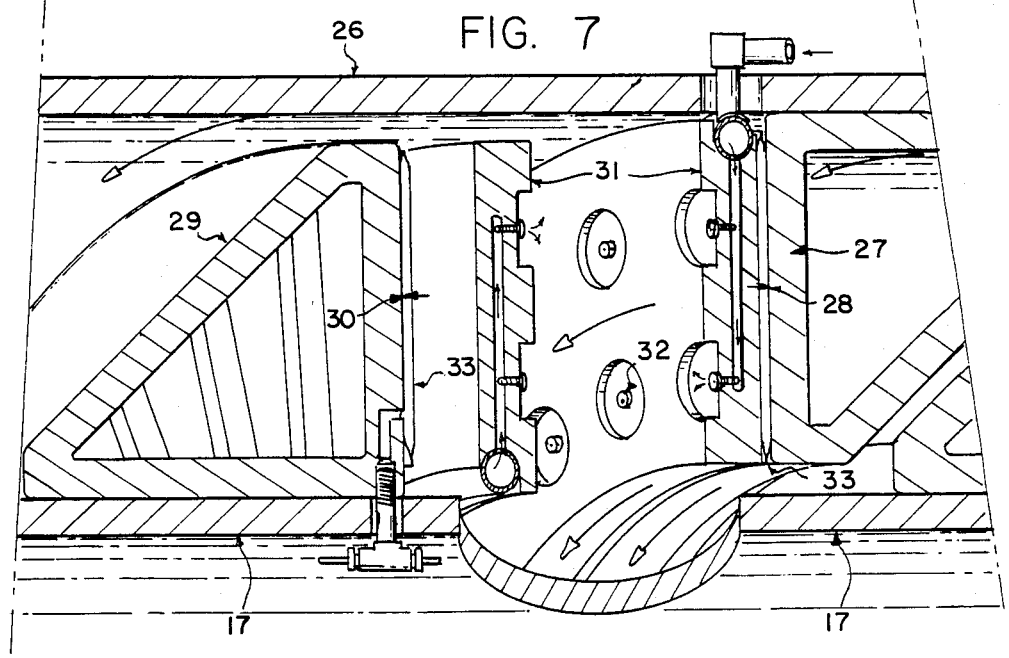
FIG. 7 is an enlarged view from FIG. 6 to show details of the hydraulic system.

Thrust bearing 18 of bearing assembly 5 is shown in greater detail in FIGS. 6 and 7. In FIG. 6, outer cylindrical housing 26 connects turbine airship compression spine 35, ring support cables 36, and blade support cables 37 to internal support frames 27, which incorporate flat, washer-shaped surfaces 28. External support frames 29 attach to the outside of cylinder 17 and extend outwardly to provide similar flat, washer-shaped surfaces 30 opposite surfaces 28.

Matched pairs of rigid, washer-shaped rings 31 are placed between opposing support frames 27 and 29. Opposing, proximate surfaces of the ring pairs 31 are to be made sufficiently flat that one ring can rotate upon the other without rubbing when separated by a film of lubricant pumped in under pressure. The hydrostatic thrust bearing thus formed has the virtue of exhibiting virtually zero friction and wear at low RPM.

Sandwich membranes 33 containing a fluid are interposed between support frames 27,29 and each pair of rings 31 as a means of providing uniform loading of rings 31 despite misalignment and stress distortion of surfaces 28 and 30 under load. The imposed thrust load may be distributed equally among the several pairs of rings 31 by interconnecting sandwich membranes 33 on the forward sides of ring pairs 31 and similarly interconnecting sandwich membranes 33 on the aft sides.

Pair 3

Figure 8:
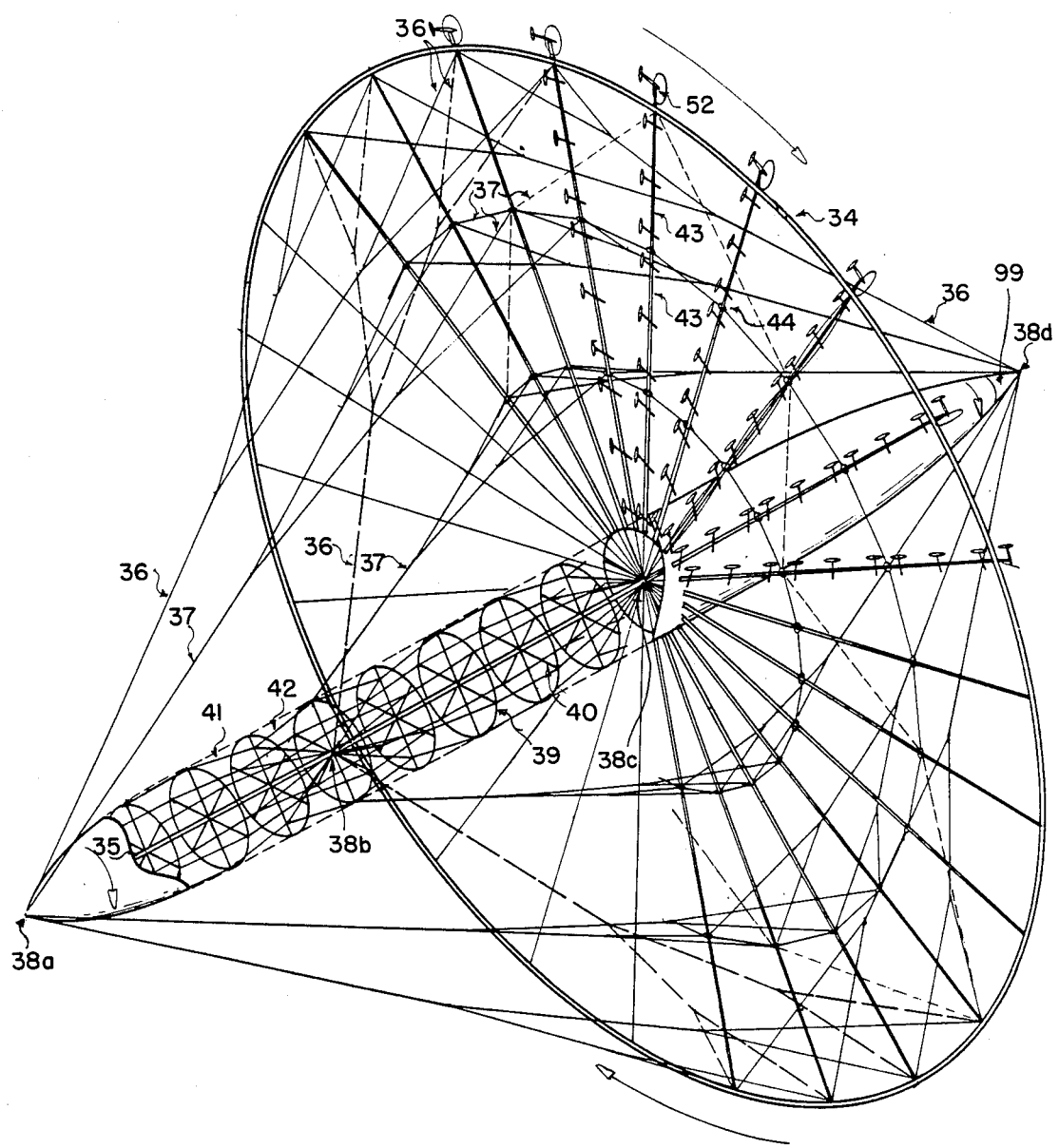
FIG. 8 is an isometric view showing in greater detail a "space frame" structure used to support the turbine blades. Also shown in cutaway are major features of the internal structure of the airship which supports the turbine.

The airship-supported wind turbine of this invention is shown in more detail in FIG. 8. Turbine compression ring 34 is supported from compression spine 35 by several sets of tensional members 36 which extend from twenty-four evenly spaced points around ring 34 in to load points 38$a,b,c,d$ along spine 35. A first set of tensional members 36 (e.t.: 2.125" diameter, 27,700 lbs) extends from ring 34 through the interior of turbine blade sections 43 to compression spine 35 and there defines load point 38$c$. A second set of tensional members 36 (e.t.: 1.5" diameter, 14,650 lbs) extends to spine 35 at a point approximately halfway between the airship nose and load point 38$c$, thus defining load point 38$b$. Third and fourth sets of tensional members 36 (e.t.: 1.5" diameter, 34,650 lbs) extend respectively to the front and rear ends of spine 35, defining load points 38$a$ and 38$d$. The set of tensional members 36 which extends from ring 34 to the front end of spine 35 (e.t.: 1.5" diameter, 19,520 lbs) serves the added function of conveying to the front end of spine 35 the longitudinally acting component of blade force exerted on ring 34.

Each turbine blade is provided with additional support by guy assemblies 44 placed at one or more intermediate points along each turbine blade 43, and by guy cables 37 which extend from guy assemblies 44 to appropriate points in the wind turbine structure. As shown in FIG. 8, some sets of guy cables 37 extend longitudinally from guy assemblies 44 to load points 38$a$, $b$, and $d$ on spine 35. Additional sets of guy cables 37 extend circumferentially between guy assemblies 44 located at the same turbine radius, thus providing circumferential support while also serving as part of a means for conveying out to compression ring 34 the circumferentially acting component of blade force exerted at guy assemblies 44. A final set of guy cables 37, shown in FIG. 8 as dashed lines for drawing clarity, extends diagonally outwards, within the plane of the turbine disk, from every fourth guy assembly 44 out to compression ring 34, to convey to ring 34 the circumferential component of blade force exerted on guy assemblies 44.

At each of the locations in FIG. 8 where a turbine blade 43 attaches to compression ring 34, a pylon 51 extends out to permit mounting a propellor and other equipment needed for producing a usable form of the power extracted by turbine airship 1 from the wind.

Figure 9:
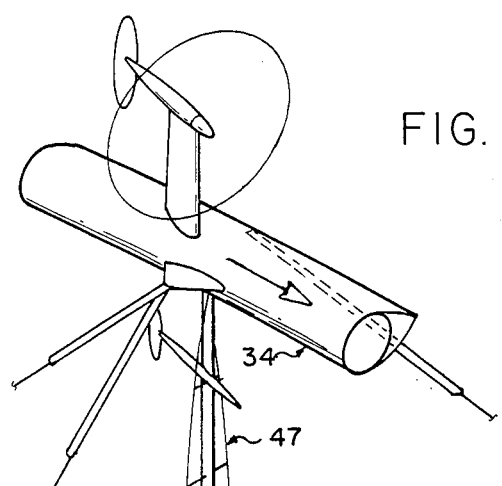
FIG. 9 is an isometric view of the outer section of one of the blades at the top of the turbine in FIG. 8.

The construction of a typical section of a turbine blade 43 is shown in more detail in FIG. 9. Transverse compression struts 45 extend, at an approximate right angle to the chord plane of airfoil member 46, from the center of lift line of airfoil member 46 to two external tensional members 47 which run from end to end of each section of blade 43.

Figure 10:
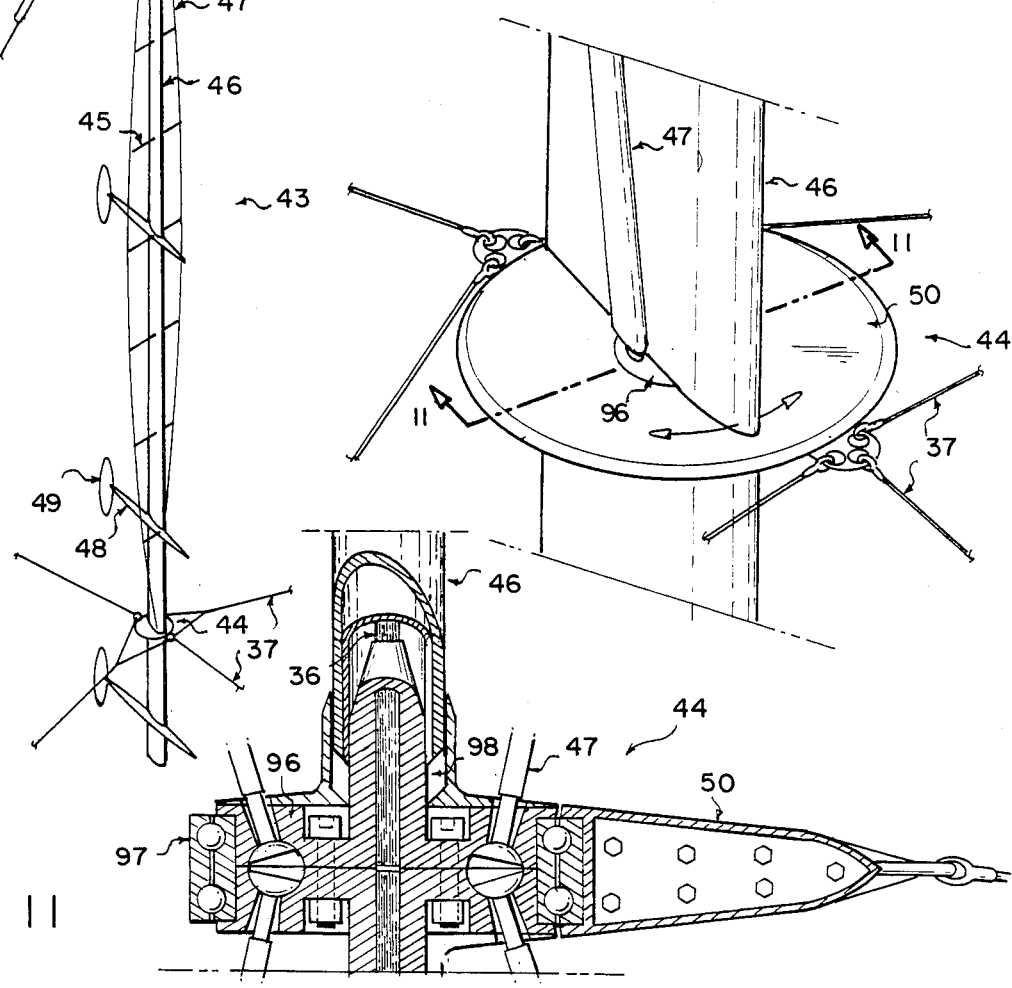
FIG. 10 is an isometric view, enlarged from FIG. 9, of a guy assembly used to provide intermediate points of support to the turbine blades.
Figure 11:
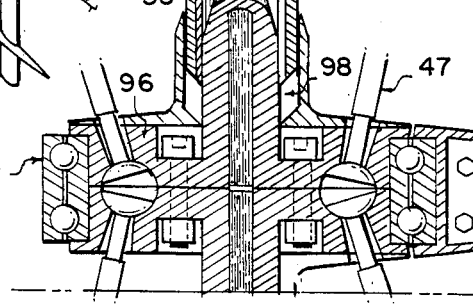
FIG. 11 is an enlarged cross-sectional view 11—11 of the guy assembly shown in FIG. 10.

FIGS. 10 and 11 show how airfoil members 46, tensional members 47, and internal ring support cable 36 (the components which extend from end to end of each blade section) attach to end fittings 96, which in turn bolt together over the inner race of radial bearing 97 to form the rotatable inner section of guy assembly 44, thus permitting airfoil members 46 to be rotated to any desired angle of incidence to local airflow.

Wind force exerted on airfoil members 46 on opposite sides of a guy assembly 44 will stress tensional members 47 to either side of the assembly. The radially acting components of the resulting tensions will balance out if equal in magnitude. An expansion joint 98 in each airfoil member 46 will insure that any remaining net radial tension will be transferred to internal ring support cable 36 rather than being exerted on airfoil member 46.

Meanwhile, transverse stress loads from wind force can build up in airfoil members 46 only over the length of span between successive struts 45, before being transferred out by struts 45 to tensional members 47, and from there to turbine components other than airfoil members 46. The resulting low stress levels in airfoil members 46 enables the weight of these members to be reduced to a small fraction of what they would have to weigh were they required to be self-supporting from a central axle in the manner of normal turbine blades.

The combination of lightweight airfoil members 46 and the rather elaborate space frame structure for supporting these members shown in FIGS. 8 and 9 is structurally much more efficient than a normal, axle-supported turbine blade would be for handling the large wind force (e.t.: 1,665,400 lbs maximum downwind force) that will be exerted with turbine disk areas exceeding 1000 feet in diameter, and thus provides part of the answer of how so large a turbine can be made light enough to be supportable on an airship of practicable size.

(e.t.: To put some of the foregoing material in more graphic terms, the turbine airship uses twenty-four blades operated at a $C_L$ or 1.6 (Wortman FX63137 profile), has a diameter of 1320 feet, and uses a compression ring circumferential velocity of 200 ft/sec. To recover maximum power at a rated wind speed of 36 ft/sec under these circumstances required that each blade's chord increase from 3.1 feet at the compression ring to 7 feet at a turbine radius of 282.4 feet. From this point on in to the airship surface, the blade chord is held constant at 7 feet to avoid excessive storm stress loads on the inner section of blade span. At a wind speed of 36 ft/sec, limiting blade chord to 7 feet results in a loss of 2.3 MW, or slightly over 4%, from the turbine's theoretically available power of 55.6 MW. Truss depth for blade sections 43 is 16 feet, each side of blade. Diameter of truss tensional members 47 found necessary to resist a 300 ft/sec gust hitting airfoil member 46 at an angle which produces the greatest bending stress load: 1.7 inch, using Kevlar 49 cable ("Kevlar" is a trademark) stressed to 120,000 lbs/in$^2$ of material cross-section as a rare storm loading. Total truss weight, excluding airfoil members 46: 44,410 lbs. Weight of airfoil members 46 for all twenty-four blades: 148,900 lbs.)

Part 4

In FIG. 8, a central compression spine 35 extends the length of turbine airship 1. From spine 35, rib spokes 40 extend radially out to rib rings 39, whose perimeters conform to the airship envelope. One such rib ring is positioned at each interior load point 38b and 38c; the remaining rib rings 39 are positioned to provide approximately equal intervals between rib rings over the length of airship 1.

Tensional members 41 extend in substantially parabolic paths between each successive pair of load points 38a, b,c,d, attaching to intervening rib spokes to form trusses centered on compression spine 35. Additional tensional members 42 extend from rib rings 39, located at load points 38b and 38c, to adjacent rib spokes as required to continue this internal truss system past load points 38b and 38c.

Figure 14:
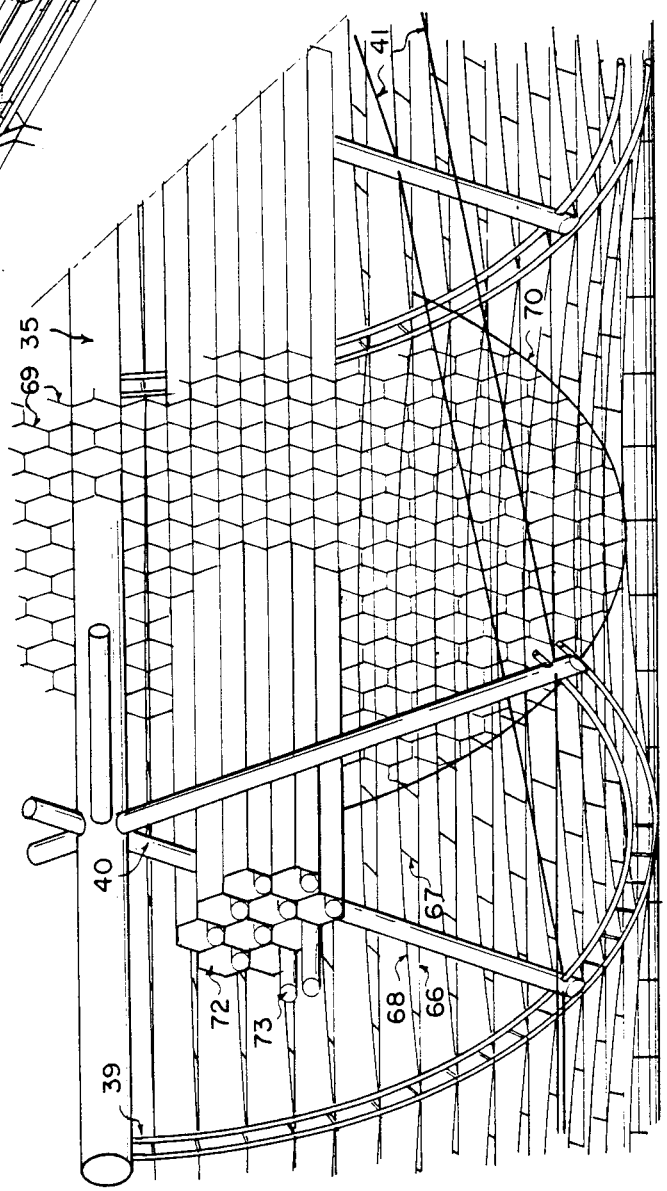
FIG. 14 is a perspective view showing in greater detail the internal structure between two successive rib rings of a typical section of the turbine airship.

Additional structure (FIG. 14) within airship 1 permits use of plastic film tubes 72 for confinement of the buoyant gas used to float this airship. In FIG. 14, tubes 72 thread longitudinally through aligned openings in a series of parallel lattices 69. (Only one lattice is shown for drawing clarity). The perimeter of each lattice 69 attaches to a ring 70, which in turn attaches to tensional members, 68.

Tensional members 68 extend in substantially parabolic paths between adjacent pairs of rib rings 39 to provide a means of transferring to rib spokes 40 the buoyant force exerted by the gas within tubes 72. Transverse spars 67 can be inserted at intervals between inward sagging members 68 and surface support members 66 to provide additional support for the airship surface covering.

Figure 15:
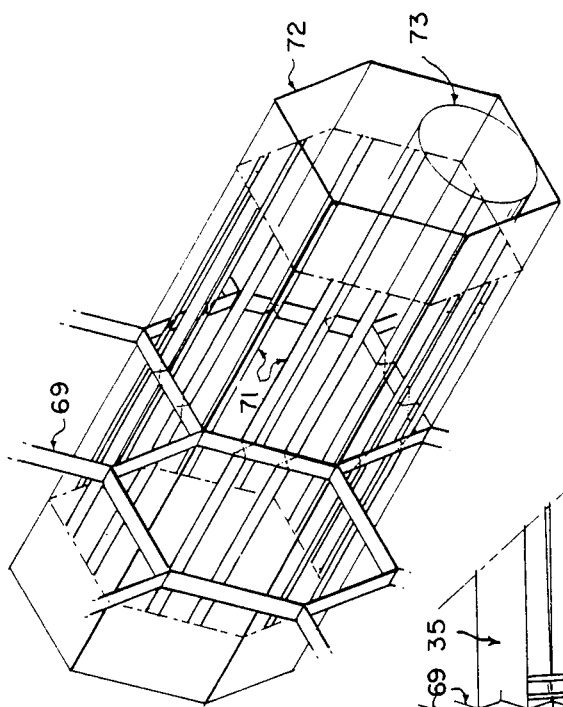
FIG. 15 is an isometric view detailing a means for longitudinal support of the buoyant gas tubes shown in FIG. 14.

Smaller tubes 73 enclosed within tubes 72 provide a means of keeping tubes 72 fully distended at all times by giving a slight excess pressure to the gas entering enclosed tubes 73. This feature will minimize abrasion of tubes 72 as they rotate with the turbine airship about the turbine rotational axis. FIG. 15 details how tapes 71 may be run longitudinally through lattices 69 to provide additional tube support.

In a preferred embodiment, the buoyant gas in tubes 72 is hydrogen. A noncombustiable gas, such as $CO_2$, is used in the smaller tubes 73, and is also used to create a barrier layer of noncombustible gas surrounding tubes 72. FIG. 16 shows schematically how this noncombustible gas is expelled from tubes 73 and from the barrier space around tubes 72 as it expands, and is used in a ballonet system to cause the expulsion of an equal volume of air to the outside of the airship. This system isolates the ship's hydrogen from the nearest air with which it could form a combustible mixture.

Part 5

Guy assemblies 44 (FIG. 9) and blade end assemblies 63 (FIG. 12) permit turbine blades 43 to rotate freely, requiring some means of exercising control over the angle of incidence of airfoil members 46 to local airflow. This can be accomplished by adjustment of the angle to control pods 48 taken by control fins 49 when both are distributed at suitable intervals along each turbine blade.

Figure 17:
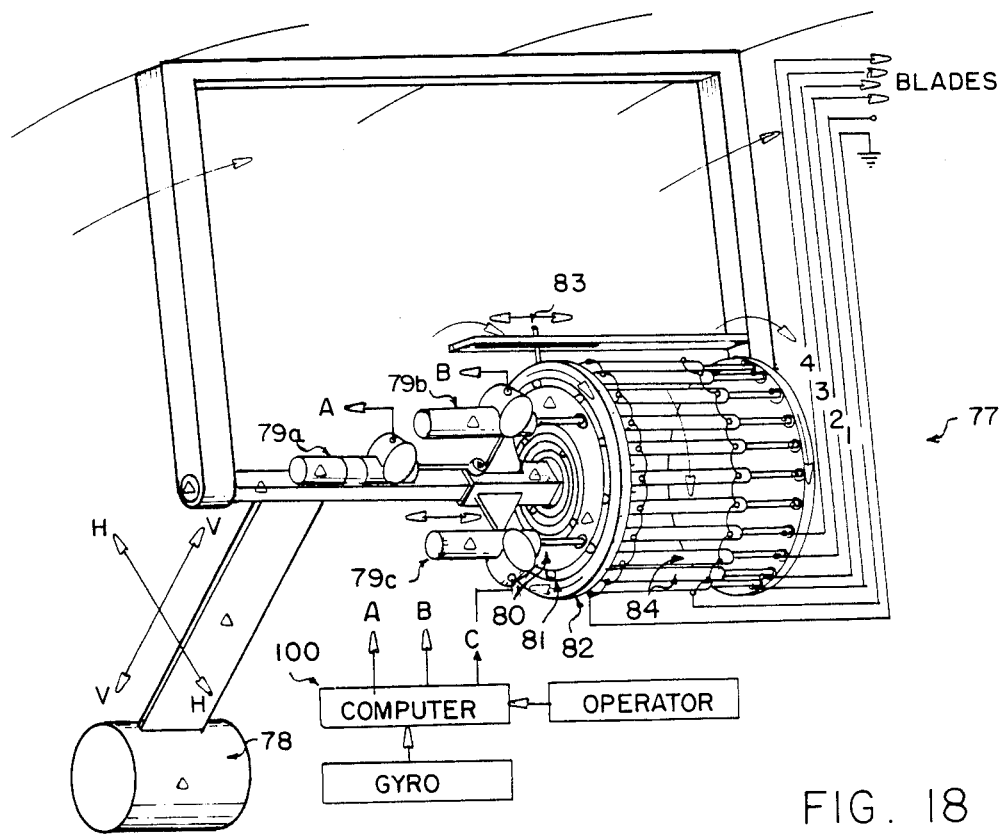
FIG. 17 is a perspective view showing a swash plate actuating linear potentiometers for flexible control of turbine blade angle of incidence.
Figure 18:
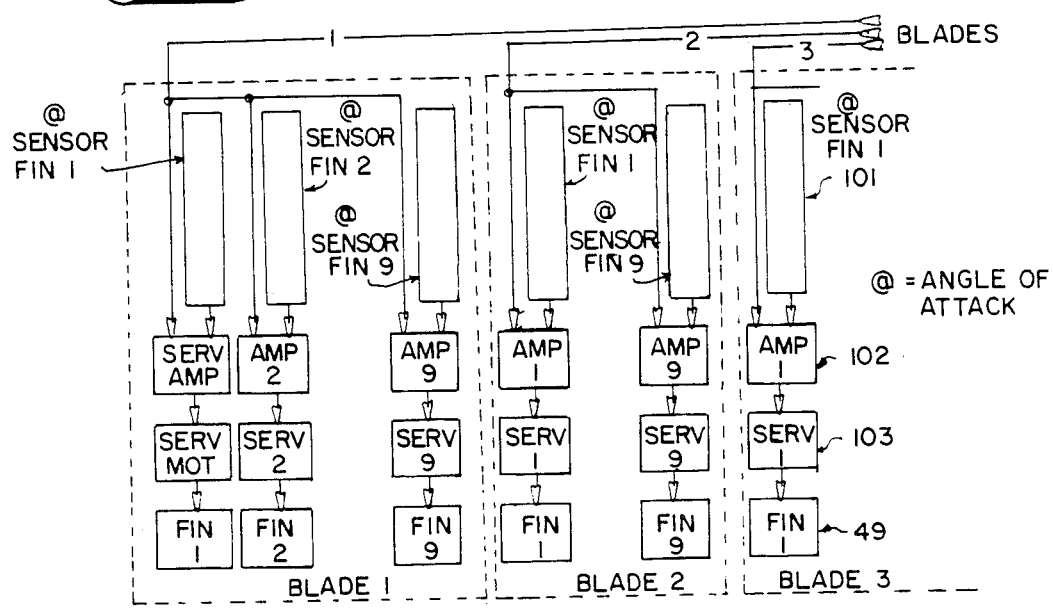
FIG. 18 is a schematic showing how standard aircraft components may be used to control turbine blade angle of incidence.

Appropriate movement of fins 49 to control angle of incidence can be accomplished by the adaptation of a standard aircraft flight control system shown in FIGS. 17 and 18. Ignoring for the minute the swash plate mechanism 77 in FIG. 17, a flight control computer 100 can use inputs from gyros, human operators, internal programs, and other sources to determine an appropriate angle of attack for the turbine blades, and send out a command signal specifying this angle of attack.

An angle of attack sensor 101 mounted in the vicinity of each control pod 48 sends out a signal reflecting the actual angle of incidence of airfoil member 46 to local airflow. A servo amplifier 102 compares the command and sensor signals and on this basis actuates a servo motor 103 so linked to control fin 49 that this fin is rotated in a direction which will bring the local angle of incidence of airfoil member 46 nearer that mandated by the command signal.

Forward extensions of control pods 48 hold ballast for balancing moments of weight acting fore and aft a rotational axis line connecting the rotatable points of support for airfoil members 46 at assemblies 44 and 63. In the absence of such balancing, control fins 49 would be required to overcome weight imbalance as a turbine blade rotated about the turbine disk area.

More flexible control over the movement of turbine airship 1 can be achieved if the angle of incidence to local airflow of airfoil members 46 can be varied in step with their angular position as they rotate around the turbine disk area. A swash plate mechanism mounted within turbine airship 1 provides one way of accomplishing this control.

Pendulum 78 in FIG. 17 keeps the gimballed inner driving element 80 of swash plate assembly 77 from rotating with the turbine airship. The vertical and horizontal eccentricity of swash plate driving element 80 can be varied by servo motors 79a and 79b in response to signals received from flight control computer 100. Bearings 81 permit pin 83 to keep the rotation of concentric outer driven element 82 of swash plate assembly 77 in step with the rotation of the turbine airship.

Linear potentiometers 84, one for each turbine blade, extend between swash plate driven element 82 and a terminus in the airship structure in such a way that any eccentricity of swash plate driving element 80 will cause the sliding contact of any given potentiometer 84 to slide along its resistive element and thus produce an output voltage which varies in step with the angular position of potentiometer 84 around the swash plate axis, and also in step with the angular position of the corresponding turbine blade around the turbine axis. The resulting output voltages vary the command signal sent to each turbine blade, permitting the smooth variation of turbine blade force over the turbine disk area in whatever manner is required to adequately control airship movement.

Part 6

Figure 12:
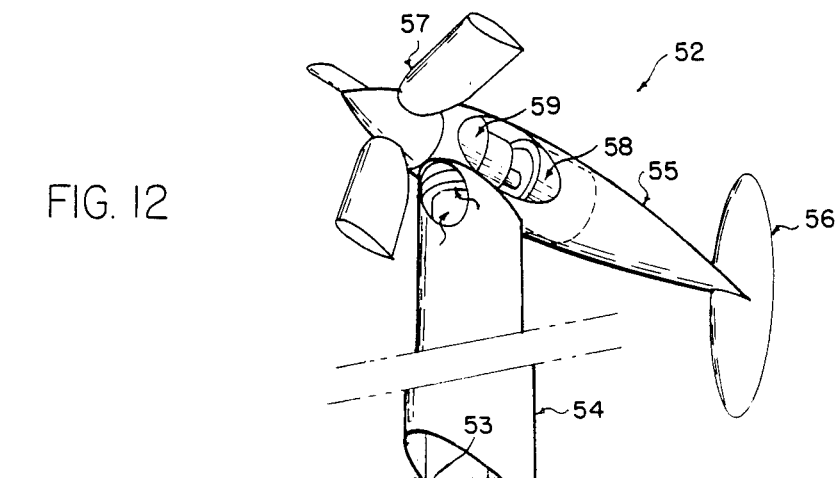
FIG. 12 is a partially sectioned view to show details of (a) the turbine compression ring, (b) the attachment of a turbine blade to this ring, and (c) the attachment of a propellor-driven generator from this ring.

FIG. 12 details how a pylon 51 can be used to support a power pod 52 on which is mounted the equipment needed for producing the turbine's useful power output. Bearings 53 permit fairing 54 and nacelle 55 to swivel about pylon 41 in response to airstream force on nacelle tail fin 56. A propellor 57, mounted at the front end of nacelle 55, drives a generator 58 by means of step-up gear box 59. Weight which is rotationally supported by bearings 53 should obviously be balanced for rotational equilibrium to avoid affecting the ability of tail fin 56 to keep propellor 57 directed into the airstream.

Propellor 57 is driven into rotation by a vector sum air velocity combining the wind's variable velocity with the much more stable circumferential velocity of the turbine out at the power pod radius. The latter velocity is normally several times the wind velocity, which has two desirable consequences: (1) A relatively small propellor diameter is required to transform the power output of the turbine's blades into propellor shaft power, resulting in a relatively high shaft RPM which reduces weight required for gear box 59. (2) A wind gust will have relatively small effect on the air velocity through the propellor disk area, which greatly reduces the problem of torque surges which could throw out of synchronism the type of lightweight, high RPM, AC synchronous generator most suitable for use in the turbine power pods.

(e.t.: Theoretically available power with blade chord restricted to 7 feet: 53.32 MW. Drag losses: turbine blades and blade trusses 5.08 MW, compression ring 1.85 MW, ring support and guy assembly cables (enclosed in streamlining sleeves) 1.93 MW, control pods and fins 0.37 MW, power pods and pylons 0.60 MW, turbine airship 0.22 MW, for a total of 10.05 MW. Net power available from turbine blades: 43.27 MW. Power pod propellor airstream slip velocity (induced velocity) is 10.46 ft/sec (5%), propellor diameter needed is 30.1 feet, propellor RPM at 800 ft/sec tip velocity is 507.6 RPM, power input to propellor disk area is 42.36 MW, generator output power is 33.32 MW, output per power pod is 1/24th this, or 1.39 MW.)

Figure 13:
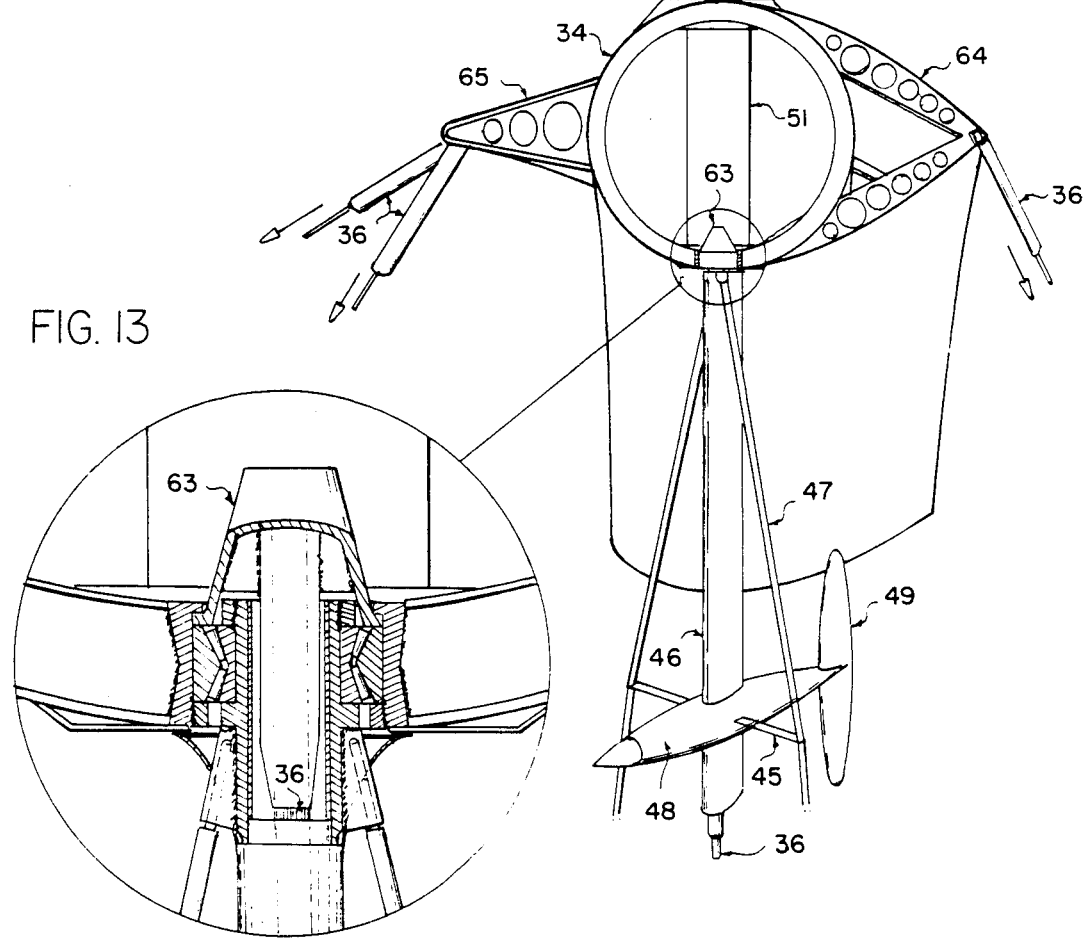
FIG. 13 shows in cross-section a bearing assembly which allows the outer end of a turbine blade to rotate freely at its point of connection to the compression ring.

FIGS. 12 and 13 also show (1) the attachment of a turbine blade 43 to compression ring 34 by means of an end bearing assembly 63, (2) the construction of fairing 64, appended to the aft side of compression ring 39 to cut down air resistance, and (3) the attachment of stub wing 65 to the front side of ring 34 to provide adequate clearance between front ring support cables 36 and the swing radius of fin 49 on the nearest control pod 48.

Part 7

The conventional AC synchronous generator weighs about 10 lbs/KW and is much too heavy for use at the perimeter of the turbine airship. Lightweight synchronous generators have been developed for the aircraft industry which weigh as little as 0.5 lb/KW, in part by operating at a much higher RPM than the maximum 3600 RPM at which a generator can be built to feed directly into a 60 Hz power line system.

FIG. 21 shows schematically how a propellor 57 at the turbine perimeter can be used with a gearbox to drive two lightweight, 4-pole AC synchronous generators at 10,800 and 12,600 RPM, thus producing output frequencies of 360 and 420 Hz, which differ in frequency by 60 Hz, the conventional AC power line frequency in the United States. The paralleled outputs of the turbine's synchronous generators at each of these frequencies can then be transmitted to ground level and mixed in transformer 90 to produce a "100% modulated" or beat frequency output whose envelope varies at 60 Hz. Rectifying and filtering units can then transform this complex wave form output into 60 Hz AC suitable for power line use.

The aircraft industry has developed the jet engine combination of compressor, combustion chamber (combustor), and turbine to the point where all three components taken together weigh less than 0.5 lb/KW of delivered shaft power, which is light enough to make feasible the addition to each turbine power pod of a compressor 104, combustor 105, and turbine 106 in the arrangement shown schematically in FIG. 21.

Clutches 107 will enable propellor 57 to be used to drive compressor 104 to compress air for storage whenever power available from the wind exceeds the utility network's current needs. This compressed air can be used later on as needed, and either fed without fuel through combustor 105 into turbine 106 or used to burn fuel in combustor 105 prior to expansion through turbine 106. The latter option will about double the power available from the stored air, while still requiring much less fuel to produce a given power output, than does a conventional combustion turbine, which uses approximately two-thirds of its fuel to compress air prior to its combustion and expansion through the turbine.

There are two options for storage of the compressed air. First, compression ring 34 in the example wind turbine is designed to be internally pressurized with air to reduce compression loads on the ring walls. The compressed air stored in the ring will be sufficient to keep all twenty-four sets of the turbine's generators operating at minimum levels for up to half an hour, thereby avoiding the need for frequent generator shutdowns and restarts in marginal wind conditions. But to store enough air for full power output for several hours will require means for transmitting the compressed air to ground level for underground storage. The same means may be used later to retrieve this air when needed for driving the wind turbine's generators.

The combination of compressor 104, combustor 105, and turbine 106 can be operated with fuel as a normal combustible turbine for driving the wind turbine generators at any time—to meet peak loads during an extended period of calm weather, for instance.

The result of these various options should be to make the airship floated wind turbine a more reliable source of power whose full power output should be available for at least half the hours in each year without need for fuel; for much of the rest of the year, only half the fuel used by a conventional combustion turbine of equivalent output would be needed.

(e.t.: Hoop diameter of compression ring 34 is 5 feet. Energy stored in ring when filled with air adiabatically compressed to 138.8 psi gauge from 13.47 psi ambient is 0.83 MWHs. Net energy available with turbine efficiency of 85%, generator efficiency of 92% is 0.65 MWHs. By burning fuel with the compressed air, the available energy doubles to about 1.3 MWHs, or enough to provide an output of 3 MW for about 26 minutes.)

Part 8

The electrical output of each power pod generator 58 can be sent by electrical cable down through pylon 51 and through airfoil member 46 (FIG. 12) to airship 1. From there, the generators' outputs can be transferred by slip ring assemblies 61, as shown in FIG. 3, past thrust bearing 18 and ground anchor 1 to an intertie with the ground system load.

At this point, some explanatory material will be added which did not readily fit into the above eight-part outline:

1. Friction with the earth's surface will normally cause air velocity through the top half of the airship floated wind turbine to be higher than through the bottom half. If air velocity through the top half of the turbine is reduced by two-thirds for maximum power recovery, the greater velocity there will cause an extra force which will tip the turbine backward if not compensated for. The water ballast system shown in FIGS.

18 and 19 can compensate for this by transferring a sufficient weight of water from the rear to the front of turbine airship 1.

Figure 19:
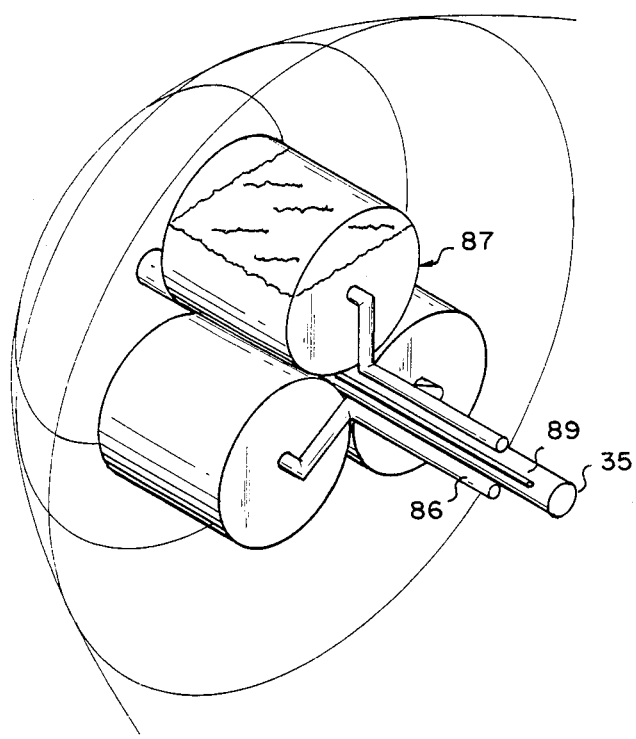
FIG. 19 is an isometric view of a means for shifting weight from end to end of a rotating turbine airship.
Figure 20:
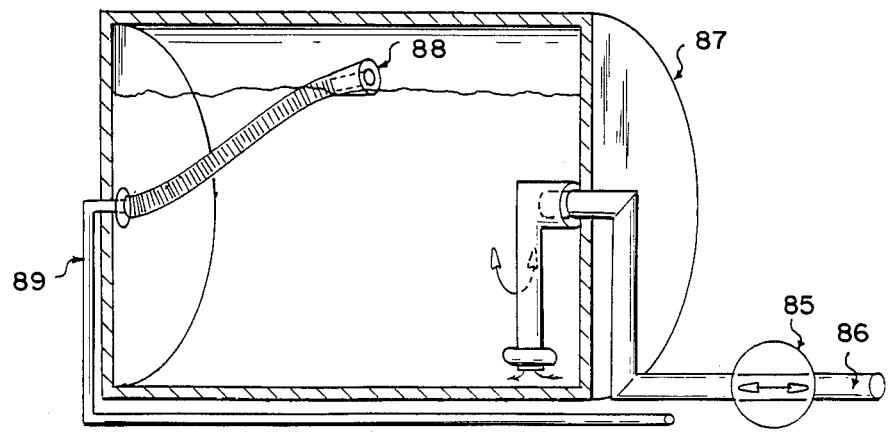
FIG. 20 is an isometric view of a pumping and venting system for the weight-shifting system shown in FIG. 19.

On the other hand, if compressed air in compression ring 34 is used to keep the turbine's generators operating at a minimum level through temporary wind lulls, ring 34 will lighten; the water ballast system shown in FIGS. 18 and 19 can compensate for this imbalance by transferring water from the front to the rear of turbine airship 1.

2. To fabricate and erect the turbine airship, the following procedure is recommended: The long tubular compression spine and compression ring are both site fabricated, each as one continuous piece, out of fiber-reinforced plastic, by one of several continuous filament winding processes which have already been developed. Compression ring 34, the power pods 52, and the turbine blade system are assembled as a complete unit, lying flat at ground level. The front end of the airship is floated over and attached to this recumbant turbine ring and blade system. This combination is then floated upward sufficiently to permit the rear end of the turbine airship to be floated in and attached, to complete the turbine airship.

While the above description contains many specificities, these should not be construed as limitations on the scope of the invention, but rather as exemplification of the preferred embodiments. Many other variations are possible, for example:

(1) suitable circuitry will enable a flight control computer to produce internally the same set of variable command signals for controlling turbine blade angle of incidence produced by the swash plate system shown in FIG. 19, (2) conventional airship gas bags can replace the combination of plastic film tubes and lattice structures shown in FIG. 14, (3) where two generators are driven at RPM which cause their output frequencies to differ by a power line frequency, said generators can use rotating fields, and their armatures can be wound so that the two armatures can be wired in series to produced directly a combined wave form whose envelope varies at a power line frequency, thus eliminating a need for a separate transformer (90 in FIG. 21) for combining their outputs.

Accordingly, the scope of the invention should be determined not by the embodiments illustrated but by the appended claims and their legal equivalents.

I claim:

1. A wind turbine system comprising:
(a) a buoyant gas airship which functions as the rotational axis for a wind turbine supported from said airship;
(b) a ring which encircles said airship to provide the outer terminus for turbine blades;
(c) multiple rotatably mounted turbine blades which extend outwardly from the airship to said ring;
(d) a plurality of tensional ring support members wherein each member extends from a point of attachment on said ring to a point of attachment along the airship structure, and wherein said points of attachment are distributed around the circumference of said ring, and along the airship structure, as required to stably support said ring from the airship, and as required to convey to the front end of the airship the longitudinally acting component of wind force exerted by the blades on said ring;
(e) means for rotating said rotatably mounted blades to an angle of incidence to airflow which will force the rotation of said ring, along with the airship, about said airship rotational axis;
(f) at least one rotatable airfoil device so mounted from said ring that said device may be used to controllably extract energy from the airflow said device experiences as it rotates with the ring about said axis;
(g) means for transmitting the energy extracted by said rotatable airfoil device to ground level, and
(h) means for offsetting the downwind force exerted by the wind turbine supported from said airship when in operation at a normal working height.

2. The wind turbine system of claim 1 wherein each turbine blade is provided with intermediate points of support by means for supporting, comprising:
(a) at least one guy assembly located at an intermediate point along each blade, to which assembly the blade is rotatably attached and from which assembly tensional support members may be extended to appropriate points in the turbine structure;
(b) a first set of tensional support members wherein one such member extends from each guy assembly forward to a point of attachment to the airship structure as required to convey to the front end of the airship the longitudinally acting component of wind force exerted by the blade at said guy assembly;
(c) a second set of tensional support members which extend from said guy assemblies to the rear end of the airship;
(d) a third set of tensional members which extend circumferentially between guy assemblies located at the same blade radius;
(e) a fourth set of tensional support members which extend diagonally outward in the plane of the turbine disk from at least one guy assembly out to said ring so that the circumferentially acting component of wind force exerted by the blades at said guy assembly may be transmitted out to said ring; and
(f) a set of tensional ring support members wherein one such member extends internally through the length of each blade from the airship out to the ring, and is attached to a rotatable inner section of each guy assembly along the length of said blade, so that the component of force acting at each guy assembly which acts radially along the length of the blade may be transferred to said member.

3. The wind turbine system of claim 2 wherein each rotatable blade section to either side of a guy assembly is supported along its length by means for supporting, comprising:
(a) tensional members which extend in arcuate paths above and below and from end to end of each rotatable blade section; and
(b) transverse spars placed at intervals along each rotatable blade section, wherein said spars extend transversely out from the blade to said tensional members, whereby the lift force exerted by the wind on the blade may be transferred to at least one of said tensional members, and from there to the ends of each rotatable blade section.

4. The wind turbine of claim 1 wherein said means for rotating blades to an angle of incidence which will force the rotation of said ring comprises:
(a) control pods distributed at intervals along each blade, wherein the rearward extension of each control pod from said blade provides a rear lever arm by which to exert a force capable of rotating said blade to a desired angle of incidence, and wherein a forward extension from said blade provides a front lever arm for the placement of weight to produce rotational equilibrium about the blade's rotational axis as established by the rotatable blade mountings at the guy assemblies and blade ends;

(b) an airfoil means, appended to the rearward extension of each control pod, for producing a variable transverse force capable of rotating said turbine blade to a specified angle of incidence to local airflow;

(c) means for producing a command signal specifying a blade angle of incidence which will force the rotation of said ring as required to produce the wind turbine's useful power output;

(d) an angle of incidence sensor, mounted in the vicinity of each blade control pod, which senses the blade's local angle of incidence and sends out a signal reflecting this angle of incidence;

(e) an amplifier which compares said command and sensor signals and uses the comparison to actuate a motor; and (f) a motor actuated by said amplifier and suitably connected to adjust said airfoil means as required to close the difference between the blade angle of incidence requested by the command signal and the blade angle of incidence reported by the local sensor.

5. The wind turbine system of claim 4 wherein, to increase control over airship movement, said means for rotating blades to an angle of incidence further includes:

(a) means for varying the command signal to cause blade angle of incidence and, therefore, blade force to vary cyclically between a maximum and minimum once for each turbine revolution in such a manner that the angular position about the turbine axis at which such maximum and minimum blade incidence occurs will coincide for all blades, wherein said angular position may be varied to shift the angular position at which maximum and minimum blade force is exerted; and (b) means for varying said command signal to increase or decrease the amplitude of said cyclical variation of blade angle of incidence.

6. The wind turbine system of claim 5 wherein said means for varying the command signal comprises:

(a) an axle mounted on the airship in a position paralleling the airship's rotational axis wherein the axle mounting permits said axle to rotate about its own longitudinal axis and wherein a means is appended to said axle to prevent rotation of the axle with respect to the earth's surface;

(b) a swash plate mounted from said axle which can be controllably tilted away from a plane orthogonal to the axis of the axle at the location of said swash plate;

(c) means for controllably tilting said swash plate to control movement of the airship;

(d) multiple swash plate-actuated means for producing a variable command signal for control of blade angle of incidence, wherein one said means is assigned to each blade, wherein each said means is disposed about said swash plate axle so that they will be actuated to vary their command signal by said swash plate while they rotate about said axle in step with the rotation of the corresponding blades around the turbine axis, so that the command signals sent out to control blade angle of incidence will cause the maximum deviation of the angle of incidence of each blade from its average value to occur at the same two opposite points around the turbine circumference, as determined by the direction of tilting of said swash plate, while causing the amplitude of said deviation to vary in proportion to the degree of tilting of said swash plate.

7. The wind turbine system of claim 1 wherein said rotatable airfoil device is mounted from the compression ring encircling the airship by mounting means comprising:

(a) a pylon which extends outwardly from said ring a sufficient distance to provide clearance for the rotation of said device; and (b) a power pod rotatably mounted by said pylon from said ring, wherein said rotatable airfoil device is mounted on said power pod, wherein an airfoil member is appended to said power pod to direct said rotatable airfoil device into the local airflow, wherein the axis of rotation of said rotatably mounted power pod is approximately directed towards the center of said ring, and wherein the weight thus rotatably supported is balanced to produce rotational equilibrium.

8. The wind turbine of claim 1 wherein the means for transmitting energy extracted by said rotatable airfoil device to ground level comprises:

(a) a gearbox driven on its input side by said rotatable airfoil device and which in turn drives two alternating current generators at shaft RPM which cause said generators to produce electrical output frequencies which differ by a lower difference frequency usable by the generator load;

(b) a transformer arranged to add the outputs of said generators to produce a compound wave form whose envelope varies at said lower difference frequency, wherein said transformer may be placed at any convenient location between the position of the generators at the turbine perimeter, and a ground level point of delivery to the generator load;

(c) means for rectifying and filtering said combined wave form to produce an electrical output at said lower different frequency, wherein said rectifying and filtering means may be placed at any convenient location between said transformer and said ground level point of delivery; and (d) means for varying generator shaft RPM to adjust frequency and phase in the electrical output at said lower difference frequency, as required for use by the generator load.

9. The wind turbine system of claim 1 wherein the means for transmitting energy extracted by said rotatable airfoil device to ground level comprises:

(a) a gearbox driven on its input side by said rotatable airfoil device and which in turn drives two alternating current generators having armatures at angular velocities which cause said generators to produce electrical output frequencies which differ by a lower difference frequency usable by the generator load, wherein the armatures of said generators are wound to allow the electrical outputs of said armatures to be wired directly in series to produce a compound wave form whose envelope varies at said lower difference frequency;

(b) means for rectifying and filtering said combined wave form to produce an electrical output at said lower difference frequency, wherein said rectifying and filtering means may be placed at any convenient location between said generators and a ground level point of delivery to the generator load; and (c) means for varying generator shaft RPM to adjust frequency and phase in the electrical output at said lower difference frequency, as required for use by the generator load.

10. The wind turbine system of claim 8 or 9, further comprising means for producing power in the form of rotational force capable of engagement to drive said generators so that the wind power available from said rotatable airfoil devices for driving said generators may be supplemented to provide a more reliable source of electrical energy.

11. The wind turbine system of claim 10 wherein the means for producing supplementary power for driving said generators comprises:

(a) an air compressor which by sequential engagement may be driven alternatively by said airfoil device to compress air for storage and later use, and by a turbine to compress air for combustion and expansion through said turbine;

(b) means for storage of the air compressed by said air compressor;

(c) an expansion turbine which is engageable to drive said generators;

(d) a combustor which allows fuel to be combusted with compressed air prior to expansion of the air through said turbine;

(e) means for selective engagement between said airfoil device, air compressor, turbine, and generators; and (f) means for directing the flow of compressed air between said compressor, said storage means, said combustor, and said turbine so that when power available from the wind exceeds current load demand said compressor may be engaged to said rotatable airfoil device to compress air for storage in said storage means, so that said compressed air may be retrieved from storage later for expansion through said turbine to supplement power available from said airfoil device for driving a generator, so that a combustor may be used to combust fuel with said compressed air to increase the supplemental amount of power available for driving said generator, so that when compressed air from storage is insufficient, said compressor, said combustor, and said turbine can be operated together as a normal combustion turbine to supply the supplementary amount of power needed.

12. The wind turbine system of claim 1 wherein the compression ring encircling the turbine-supporting airship employs a tubular construction which permits sustaining a pressure within said ring in excess of the pressure outside said ring so that said ring may be filed with compressed gas to reduce compressive stress in the ring wall and so that storage may be provided for compressed gas.

13. The wind turbine of claim 1 wherein said buoyant gas airship for support of a wind turbine is capable of withstanding concentrated loads imposed by said turbine by an internal airship structure which comprises:

(a) a central, longitudinal spine;

(b) at least one interior load point defined as a point along said spine where a concentrated load will be imposed by said wind turbine;

(c) rib spokes extending radially outwardly from said central longitudinal spine to rib rings which conform to the surface of said airship, wherein one such rib ring is located at each said load point, wherein the remaining rib rings are distributed to provide approximately equal spacing between all rib rings over the length of said spine, and wherein said rib spokes are aligned with each other along said spine;

(d) tensional members which follow arched paths between the ends of said spine and said interior load point and between each pair of successive interior load points, and which connect to intervening rib spokes to form arched trusses centered on said spine;

(e) additional tensional members which extend from said rib ring located at each interior load point to the locations on the rib spokes of adjacent rib rings to which are attached the tensional members of said arched trusses centered on said spine; and (f) means for conveying to said rib rings the distributed lifting force exerted by the buoyant gas used within said buoyant gas airship.

14. The wind turbine of claim 13 wherein structural means are adapted to convey to said rib rings the distributed lift force exerted by the buoyant gas used in the airship, and wherein said structural means comprises:

(a) inwardly sagging tensional members which run longitudinally between said rib rings;

(b) transversely disposed lattices spaced at equal intervals between each successive set of rib rings, wherein said lattices are attached at their perimeters to said tensional members running longitudinally between rib rings;

(c) members which attach to and run longitudinally between lattices, whereby longitudinal support is provided between lattices for tubes containing the buoyant gas; and (d) tubes containing the buoyant gas and threaded through the openings of said lattices so that the lift force exerted by the buoyant gas may be transferred to said rib rings.

15. The wind turbine system of claim 1, further comprising means for linking the airship at operational height to a ground level anchor point, including:

(a) a tethering means which extends from a ground anchor to a bearing assembly located at the nose of said airship, the bearing assembly permitting the airship to rotate as a unit with the turbine it supports without producing a similar rotation in said tethering means, and permitting the airship freedom of angular motion with respect to said tethering means; and (b) buoyant lift means for offsetting the vertical component of the tension that will be induced in said tethering means by the maximum expected turbine downwind force.

16. The wind turbine system of claim 15 wherein the buoyant lift means comprises:

(a) a second airship connected by separate tether lines extending upwardly from said bearing assembly at the nose of the turbine-supporting airship; and (b) buoyant gas within said second airship is sufficient volume to exert a net lift force at said bearing assembly to offset said vertical component of tension.

17. The wind turbine system of claim 15 wherein the buoyant lift means comprises:
(a) additional buoyant gas enclosed within the airship in sufficient volume to exert a net lift force at the bearing assembly to offset said vertical component of tension; and
(b) ballast in said airship of sufficient weight that the upward moment of force exerted by said buoyant gas about the bearing assembly at the nose of the airship is balanced by the downward moment of force exerted by said ballast.

18. The wind turbine system of claim 15 wherein said ground anchor comprises:
(a) a substantially vertical axle fixed to the earth's surface;
(b) a sleeve rotatable around said axle; and
(c) a horizontal axis hinge bearing attached to the side of said sleeve, wherein the outwardly extending side of said hinge bearing is elongated to create a lever arm, wherein said lever arm incorporates a shock absorber for absorbing snap loads in the tethering means, and wherein said tethering means attaches to and extends out from said shock absorber incorporated into the lever arm.

19. The wind turbine system of claim 15, further comprising a means for transporting men and materials, including:
(a) a vehicle for enclosing men and materials;
(b) elongated members for support of said vehicle, wherein said elongated members are attached to said tether line and extend from the ground anchor up to the bearing assembly at the nose of the airship; and
(c) means for propelling said vehicle between said ground anchor and said airship.

20. The wind turbine system of claim 15 wherein said bearing assembly at the nose of the airship comprises a thrust bearing for rotationally decoupling the airship from the tethering means, wherein an aft connecting side of said thrust bearing connects to the airship and a fore connecting side connects to the aft side of a vertical axis hinge bearing, said fore side of which connects with the aft side of a horizontal axis hinge bearing, and wherein the fore side of the horizontal axis hinge bearing is elongated to provide a lever arm to which is attached the upper end of the tethering means.

21. The wind turbine system of claim 1, including means for safely using a buoyant, combustible gas, comprising:
(a) separate containment means within the airship for said buoyant, combustible gas, wherein the dimensions of said containment means allow surrounding said buoyant gas with a barrier layer of noncombustible gas;
(b) containment means within said airship for said noncombustible gas in sufficient volume to provide said barrier layer and also to provide the ballonet volume needed to allow the expansion of the buoyant, combustible gas with changes in temperature and airship altitude;
(c) separate containment means within said airship for a volume of air which equals in volume the maximum expected change in volumes of said noncombustible and buoyant combustible gases attendant to changes in airship temperature and altitude, wherein said containment means opens to the outside of said airship; and
(d) ballonet means for causing any expansion and contraction of said buoyant, combustible gas and said noncombustible gas to move an equal volume of air out of and back into said airship while keeping said air, said noncombustible gas, and said buoyant, combustible gas physically separated from each other.

22. The wind turbine system of claim 1, including means for shifting weight to trim said airship longitudinally, comprising:
(a) fluid storage chambers at each end of said airship;
(b) interconnecting means to pump fluid between the several chambers; and
(c) fluid stored in the chambers.

* * * * *